Sept. 9, 1969  A. KEPES  3,465,575
PROCESS AND APPARATUS FOR DETERMINING THE VISCOSITY AND
ELASTICITY PROPERTIES OF A SOLID OR LIQUID
VISCOELASTIC MEDIUM
Filed Oct. 11, 1966  6 Sheets-Sheet 1

INVENTOR
ANDRÉ KEPES
BY
Bacon & Thomas
ATTORNEYS

INVENTOR
ANDRÉ KEPES
BY
Bacon & Thomas
ATTORNEYS

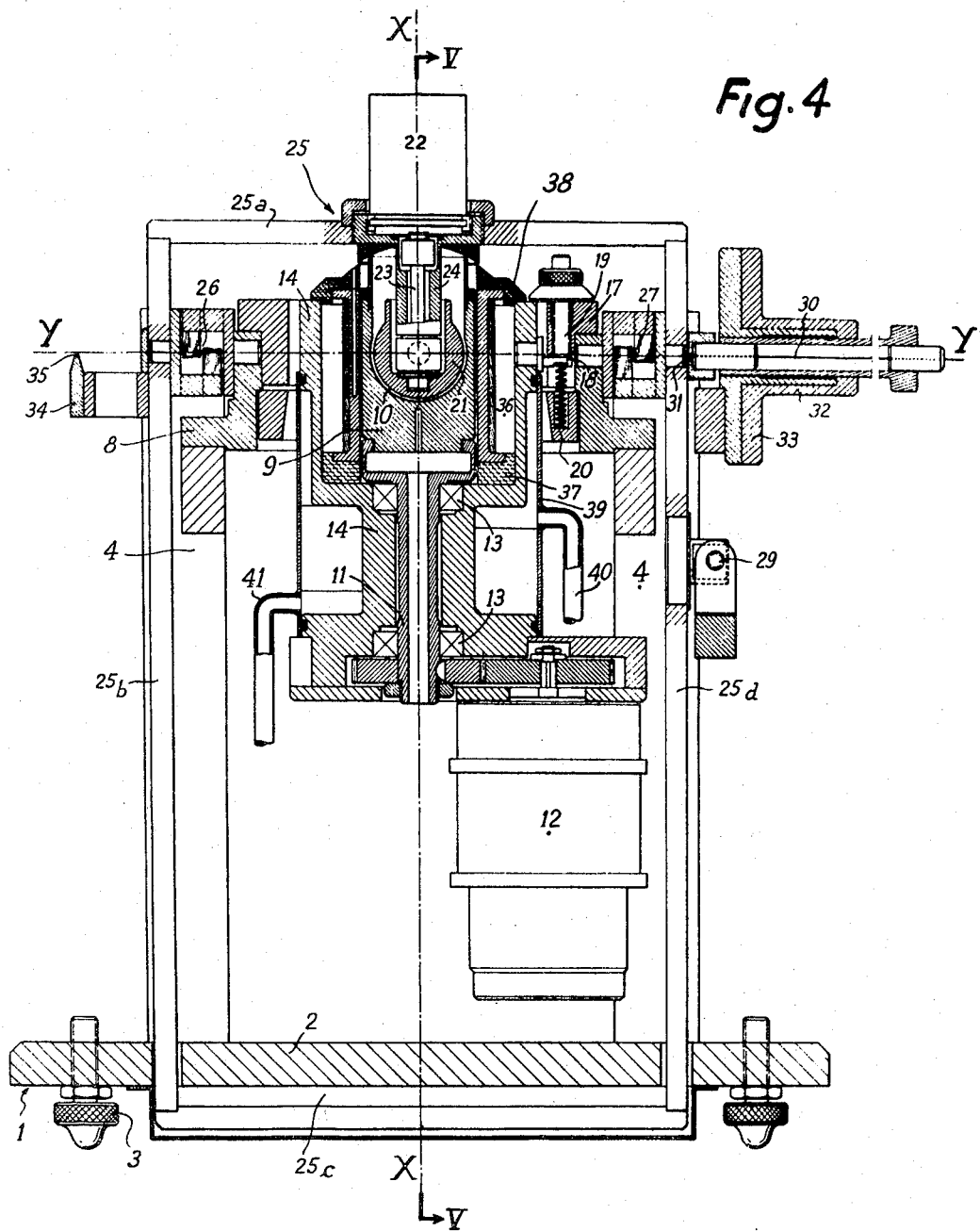

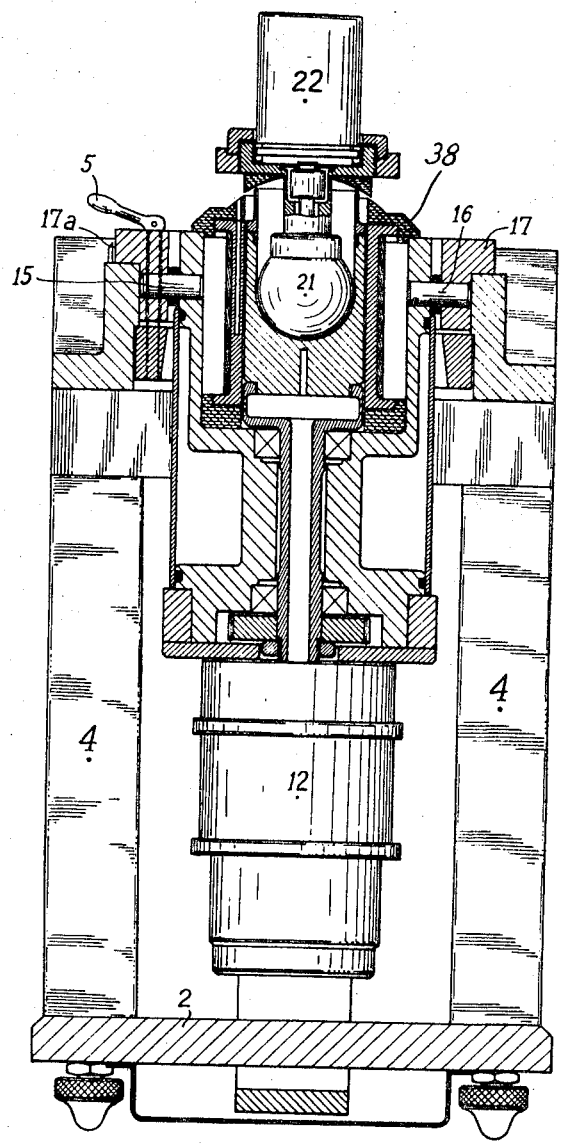

Sept. 9, 1969 A. KEPES 3,465,575
PROCESS AND APPARATUS FOR DETERMINING THE VISCOSITY AND
ELASTICITY PROPERTIES OF A SOLID OR LIQUID
VISCOELASTIC MEDIUM
Filed Oct. 11, 1966 6 Sheets-Sheet 6

INVENTOR
ANDRÉ KEPES
BY
Bacon & Thomas
ATTORNEYS

United States Patent Office 3,465,575
Patented Sept. 9, 1969

3,465,575
PROCESS AND APPARATUS FOR DETERMINING THE VISCOSITY AND ELASTICITY PROPERTIES OF A SOLID OR LIQUID VISCOELASTIC MEDIUM
André Kepes, Arras, France, assignor to Ethylene-Plastique, Paris, France, a French society
Filed Oct. 11, 1966, Ser. No. 585,959
Claims priority, application France, Oct. 21, 1965, 35,686
Int. Cl. G01n 11/00
U.S. Cl. 73—60     10 Claims

ABSTRACT OF THE DISCLOSURE

Viscosity and elasticity measuring wherein the material to be measured is placed between opposed surfaces which are then rotated in the same direction at the same speed about intersecting but non-aligned first and second axes and the reaction torque on the assembly is measured about a third axis in the plane containing the first and second axes, as a measure of viscosity, then about a fourth axis perpendicular to that plane, as a measure of elasticity.

---

This invention relates to a process and apparatus for determining the viscosity and elasticity properties of a solid or liquid viscoelastic medium.

Distortion of any material body is always accompanied by a mechanical energy dissipation effect. The energy required for the distortion or deformation is normally present in two forms:

a recoverable energy stored in the body by elasticity and dependent upon the modulus of elasticity of the body, and a non-recoverable energy which is dissipated as heat by a phenomenon called "internal friction" in the case of solids and "viscosity" in the case of liquids, depending upon the modulus of dissipation of the particular body concerned.

According to one aspect of the invention there is provided a process for determining the viscosity and elasticity properties of a solid or liquid viscoelastic medium, comprising the steps of inserting the medium between opposed surfaces, rotating the surfaces at the same speed and to the same hand about unaligned but converging axes, and sensing the reaction torque applied by the medium to one of the surfaces.

According to another aspect of the invention there is provided a rheometer balance for determining the viscosity and elasticity properties of a solid or liquid viscoelastic medium, comprising a rigid frame, opposed surfaces between which the medium is to be inserted and mounted for rotation relative to the frame about unaligned but converging axes, means for rotating the surfaces at the same speed and to the same hand, and means for sensing the reaction torque applied by the medium to one of the surfaces.

Features and advantages of the invention will be apparent from the following description of an embodiment thereof given, by way of example only, in conjunction with the accompanying drawings, in which:

FIGURE 4 is an elevation, sectioned along a plane of vertical symmetry of a rheometer balance for carrying out the process according to the invention;

FIGURE 5 is a left-hand view of the rheometer balance in section on the line V—V of FIGURE 4;

Figures 1, 3:
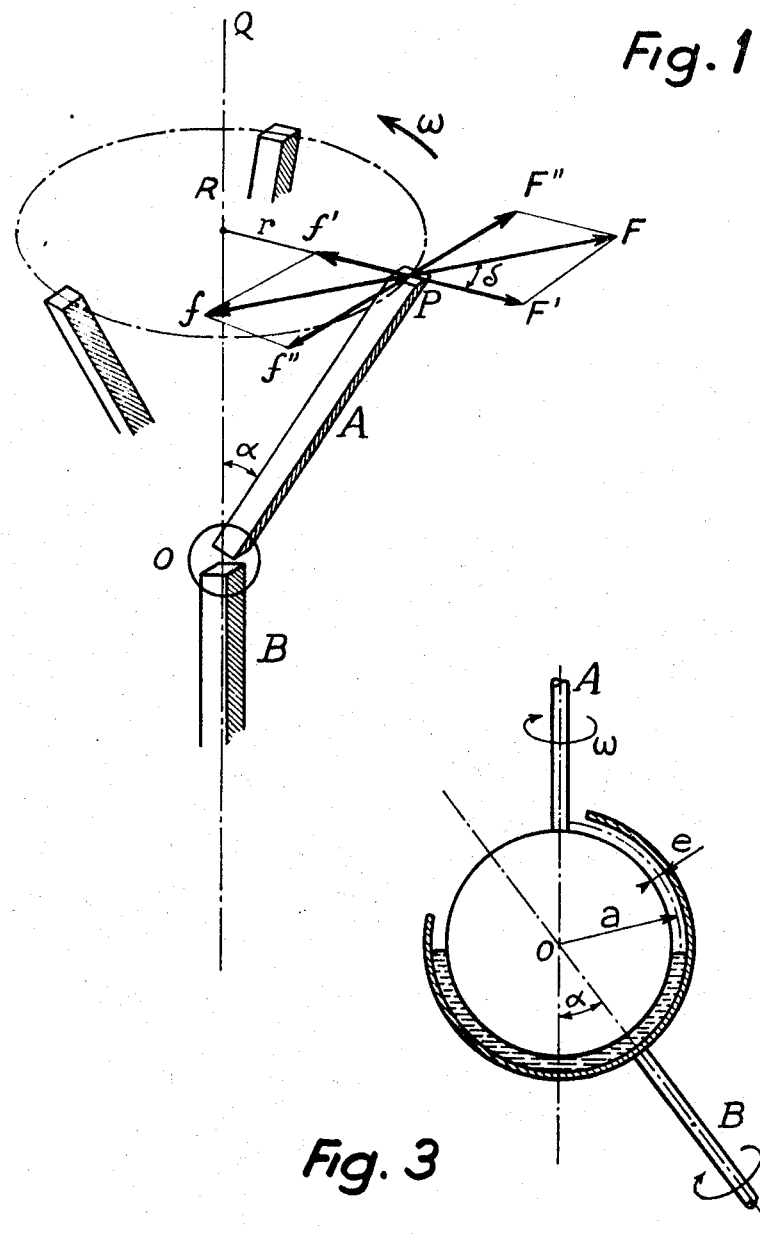
FIGURES 1, 2 and 3 are diagrammatic explanations of the forces and actions experienced by solid and liquid specimens rotated around two axes which are themselves rotating synchronously and at an inclination of angle $\alpha$ to one another.
Figure 2:
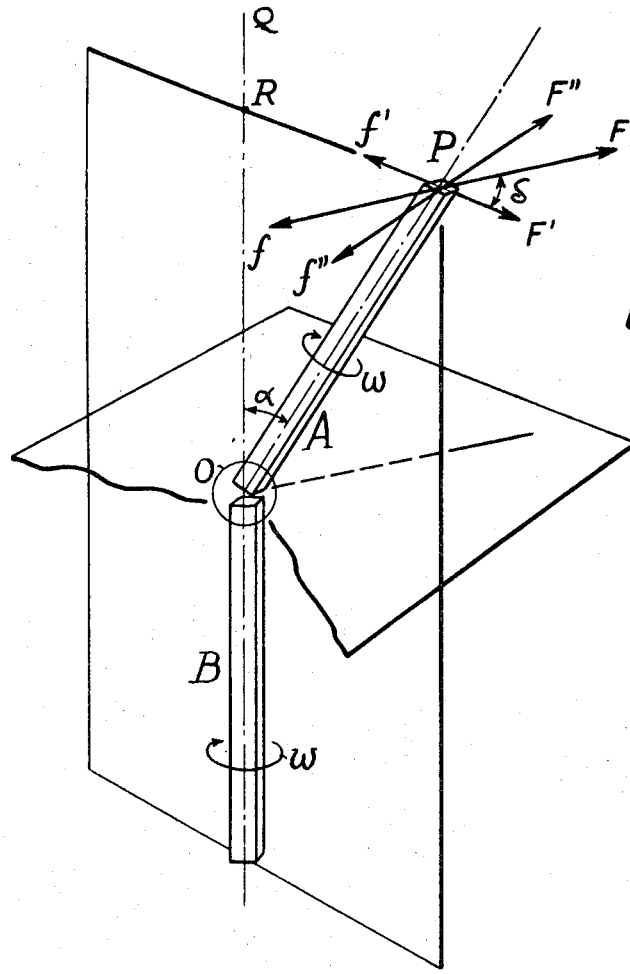
Figure 7:
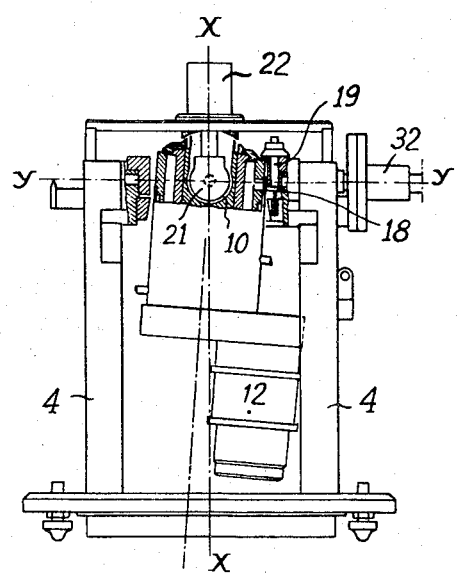
FIGURE 7 is a view of the rheometer balance in elevation when the axes of rotations are at a reduced inclination to one another.
Figure 6:
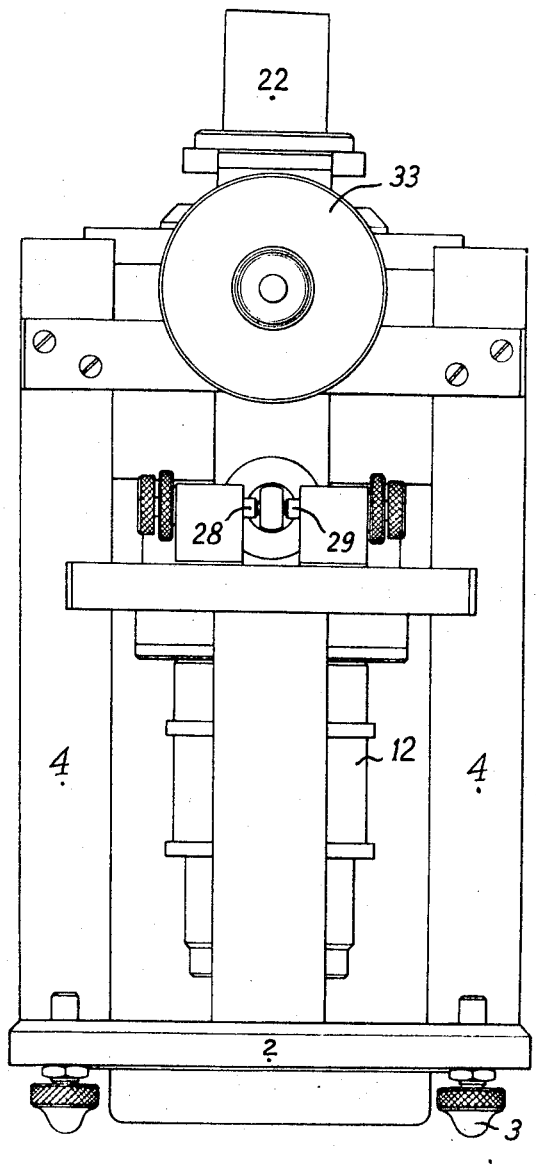
FIGURE 6 is a right-hand view of the rheometer balance.

Referring to FIGURES 1 to 3, it will be assumed that two rods A, B are inclined to one another at an acute angle $\alpha$ and interconnected at one of their ends by an articulation O diagrammatically shown as a circle. It will be assumed that articulation O is of the constant velocity kind—so that the two rods A, B rotate at the same speed to one another around their respective axes; articulation O also has viscoelastic return means which always tends to return the two rods into a position in which one is in extension of the other and tends by viscous friction to oppose the relative displacement of the articulated ends of the two rods A, B.

During a first period of time (FIGURE 1) it will be assumed that, with the rod B stationary, a point P on rod A describes a circle of centre R and radius $r$ around axis OQ of rod B at an angular velocity $\omega$—in other words, rod A describes a cone of apex O and of apex half-angle $\alpha$. Since rod B is stationary around its axis, rod A too is unable to rotate around its axis since articulation O is of the constant velocity kind. However, rod A can readily describe a cone of apex O and apex half-angle $\alpha$ while remaining stationary about its own axis.

To make this movement easier to understand, the rods A, B shown in FIGURES 1 and 2 are shown as being of square cross-section. A careful study will show that in a movement of this kind, that end of the rod A which is articulated at O moves relatively to that end of the rod B which is articulated at O. Consequently, the viscoelastic articulation O tends to oppose this relative movement with a viscous force $f''$ proportional to the angular velocity $\omega$ of the point P and—if angle $\alpha$ is small—substantially tangential to the circular trajectory of point P.

By virtue of its resilient nature, articulation O also applies to point P a resilient return force $f'$ directed towards the centre R of the circle described by P. Consequently to overcome the forces $f'$ and $f''$ and keep the point P moving uniformly on its trajectory, a force F which breaks down into two forces F' and F'' equal and opposite to $f'$ and $f''$ respectively, must be applied to the point P, the angle of F' and F'' being $\delta$.

The distance $RP=r$ defines deformation of the system due to the force F.

In a second period of time (FIGURE 2), it is assumed that, without any change in the movement described during the first period of time, an observer rotates around the axis OQ with the point P and at the same velocity. So far as the observer is concerned the point P is stationary, the rod B turns around its axis at an angular velocity—$\omega$, and the rod A, which is connected to the rod B via a constant velocity articulation, also rotates around its axis at the angular velocity—$\omega$. To this observer the force F is the force required to keep the point P stationary when the two inclined rods A, B rotate at the same velocity—$\omega$ around their respective axes. This force F balances the resultant $f$ of the elastic reaction force $f'$ and viscous reaction force $f''$ which the articulation O applies to the point P. These reaction forces $f'$, $f''$ correspond to an elastic reaction torque C' and a viscous reaction torque C'' which the articulation O applies to the rod A and which have the respective moments $f'd$ and $f''d$ if $d$ denotes the distance OR, these moments being measurable around an orientable axis Ox disposed in the plane which passes through O and is perpendicular to the axis OQ. If Ox is perpendicular to the plane of two rods, C' is measured; if O$x$ is in the plane of the two rods, C" is measured; if O$x$ makes an angle $\delta$ with the plane of the two rods, the measure torque is zero—i.e., this is the way of measuring $\delta$.

This study therefore shows that, when two rods interconnected by a viscoelastic connection run at the same speed as one another and are maintained at an inclination angle $\alpha$ to one another, the viscoelastic connection applies to one of the rods a reaction torque which can be broken down into two torques, one depending upon the elasticity of the viscoelastic connection and the other upon the viscosity thereof.

Still on the foregoing system, two cases can be considered concerning the physical nature of the connection O in order to define more closely the relationships between the forces F' and F", the deformation $r$ and the angular velocity $\omega$. If this connection behaves like a linear viscoelastic solid which can be assimilated to a Kelvin-Voigt solid, diagrammatically represented by a parallel arrangement of a spring and a damper, then:

$$F' = Er$$

E denoting the elasticity modulus associated with the point P being stressed:

$$F' = \eta r \omega$$

$\eta$ denoting the coefficient of viscous resistance of the solid, and $tg\delta = F''/F' = \eta\omega/E$.

If, on the other hand, the connection acts like a linear viscoelastic liquid which can be assimilated to a Maxwell fluid, diagrammatically represented by a spring and a damper in series with one another, the foregoing relationship become:

$$F' = \frac{\eta^2 \omega^2}{E} r$$

$$F'' = \eta \omega r$$

and $$tg\delta = \frac{F''}{F'} = \frac{C''}{C'} = \frac{E}{\eta\omega}.$$

One way of embodying a connection of this kind is to place a liquid under study between two concentric part-spherical portions of centre O, the radii of the two portions being similar to one another, the hollow part-spherical portion of greater radius being connected, in the view shown in FIGURE 3, to rod B while the inner part-spherical portion is rigidly connected to rod A. When the two part-spherical portions rotate at the same speed and to the same hand around their respective axes, the formula for the viscous reaction torque C" transmitted by the liquid to rod A, on the assumption that angle $\alpha$ is small, is:

$$C'' = \frac{8\pi}{3} \frac{a^4}{e} \sin \alpha \eta \omega$$

in which $a$ denotes the mean radius of the two part-pherical portions and $e$ denotes the difference between the radii of such portions. This formula is deduced from the following general formula for the torque transmitted in a viscosimeter having concentric spheres a radii $r_1$, $r_2$, one sphere being stationary and the other being movable around an axis at an angular velocity $\omega$:

$$C = \frac{8\pi}{\left(\frac{1}{r_2}\right)^3 - \left(\frac{1}{r_1}\right)^2} \eta \omega$$

When $r_1$ and $r_2$ are very similar to one another with $$r_1 - r_2 = e$$

then:

$$C r \frac{8\pi}{3} \frac{a^4}{e} \eta \omega$$

$a$ denoting the mean radius of the two spheres. If the two spheres each rotate at the velocity $\omega$ around two axes inclined to one another at a small angle $\alpha$, the instantaneous angular velocity of rotation of one of these spheres relatively to the other is:

$$\gamma = \omega \frac{\sin \alpha}{\cos \frac{\alpha}{2}}$$

or, if $\alpha$ is small:

$$\gamma \simeq \omega \sin \alpha$$

when the foregoing formula:

$$C'' = \frac{8\pi}{3} \frac{a^4}{e} \sin \alpha \eta \omega$$

The coefficient of viscous resistance $\eta$ of the particular liquid under study can therefore be determined by measuring C". If C" or $tg\delta$ is then measured, E can be determined via the relationship:

$$tg\delta = \frac{C''}{C'} = \frac{E}{\eta \omega}$$

Referring to FIGURES 4 to 9, the rheometer balance comprises a rigid frame 1 formed by a plate 2 mounted on lockable screws 3 and having mounted on it four columns 4 on which a horizontal ring 8 is secured, the ring 8 being disposed on the vertical axis of symmetry X of the rigid frame 1. A hollow dish 9 whose inner wall has the shape of a part-spherical surface 10 centred at a point O disposed on the axis X is extended at the bottom by a shaft 11 in alignment with the centre O. The shaft 11, which is coupled with a motor 12 adapted to rotate the shaft 11 and the dished member 9, is retained in a cradle 14 with the interposition of ball bearings 13. The cradle 14 is mounted for pivoting around an axis passing through the centre O of the part-spherical surface 10, through the agency of two trunnions 15, 16 rotatable in a stepped and graduated ring 17 which is disposed on the axis X, is freely rotatable in the stationary ring 8 and whose angular position is indicated by a fixed pointer 17$a$.

Cradle 14 can therefore be orientated in all directions, and the moving ring 17 can be secured to the stationary ring 8 in any required position through the agency of screws 5. Also, cradle 14 can be inclined to the vertical by being pivoted around the trunnions 15, 16 through an adjustable angle not exceeding about 15°, a space being left between the cradle 14 and ring 17 to allow the cradle 14 some freedom to pivot. To adjust the inclination of the cradle 14, an abutment 18 which is rigidly connected thereto but which is disposed at 90° to the axis of the trunnions 15, 16, can be adjusted in vertical position by an adjusting screw 19 turning in the moving ring 17, to tilt the cradle 14 through an adjustable angle around the axis of the trunnions 15, 16. A spring 20 keeps the abutment 18 engaged with the screw 19.

Inside the member 9 is a part-spherical ball 21 which has the same centre O as the part-spherical surface 10 but a slightly smaller radius than the latter, the space between the items 10 and 21 being adapted to receive the liquid which it is required to study. The ball 21 can be rotated by a motor 22 via a vertical shaft 23 whose axis is coincident with the axis X and which is mounted in a coaxial tube 24 with the interposition of ball bearings. Tube 24 is rigidly connected to a rectangular frame 25 formed by 4 arms or branches 25$a$, 25$b$, 25$c$, 25$d$ adapted to pivot freely and without friction around a stationary horizontal axis Y passing through the centre O and defined by two pivots 26, 27 in the form of crossed resilient strips which connect the arms 25$b$, 25$d$ of the frame to the ring 10. The pivoting motion of the frame 25 is limited by two screw abutments 28, 29 which are rigidly secured to the frame and which are near enough to one another to allow the frame to pivot only something like an angle minute on either side of the vertical position of the branches 25$b$ and 25$d$. The ends of the screws 28, 29 each have an electric contact (not shown) adapted to act via a relay to operate a signalling device when the frame contacts either of the screws 28 or 29. This signalling or indicating device has a sensitivity of the order of an angle second.

Disposed in alignment with the horizontal axis Y is a calibrated torsion wire 30, one end of which is connected to the frame 25 by a member 31 in extension of the pivot 27; the other end of the wire 30 is connected to the end of a tube 32 rigidly secured to a graduated drum 33 for twisting the wire 30 through a measurable angle. A balance beam 34 rigidly secured to frame arm 25b has a number of knife edges 35 disposed along a horizontal line which intersects the axis Y perpendicularly thereto; weights can be hung on the knife edges 35 to apply a measurable torque to the frame 25 in addition to the torque produced by the torsion wire 30.

The drive systems 12, 22 are coupled so as to rotate the member 9 and ball 21 at the same speed and to the same hand as one another around their respective axes.

The drive can be embodied in various ways. The motors 12, 22 can be two synchro receivers connected to a single synchro transmitter (not shown). Alternatively, the motor 12 can be a synchronous motor which drives the ball 21 mechanically via a transmission including universal joints, in which event the motor 22 can be omitted.

The rheometer balance has means for heating and controlling the heating of the member 9, such means being disposed in the cradle 14 and comprising a temperature-controlled oven 30 retained between two centering members 37, 38 made of a heat insulant. One facility provided by the heating means is that bodies which are solid at ambient temperature can be studied when molten. An enclosure bounded on the inside by the cradle 14 and on the outside by a hermetic jacket 39 can have water flowing through it, the water being supplied and removed via flexible members 40, 41, to prevent overheating of the drive elements. A thermocouple (not shown) can be placed in the body of the member 9 to supervise the temperature thereof by action on the heating of the oven 36.

This rheometer balance can be used to measure the torques which a liquid under study and in the space between the member 9 and ball 21 applies to the frame 25 associated with the ball 21, when the member 9 and the ball 21 are driven at the same speed and to the same hand as one another around their respective axes. At the start of measurement, the frame 25 is vertical and contacts neither of the screws 28, 29. The inclination of the axis of rotation of the member 9 relatively to the axis of rotation X of the ball 21 is adjusted by pivoting the cradle 14 through a required angle around the trunnions 15, 16 by operation of the adjusting screw 19. The cradle 14 is then orientated by rotating the moving ring 17 so as to position the vertical plane containing the axis of rotation of the member 9 and the axis of rotation X of the ball 21 at a predetermined angle relatively to the stationary suspension axis Y of the frame 25. When the member 9 and the ball 21 rotate, the frame 25 experiences a torque which is the result of the reaction of the liquid under study o nthe ball 21, the torque being transmitted to the frame 25 via the tube 24 rigidly connected thereto. The frame then contacts one of the screws 28 or 29, a fact which is indicated to the operator through the agency of the elastic contacts hereinbefore referred to. The torque is measured by a zero method, by being balanced by an opposing torque produced by twisting the torsion wire 30 through an angle such that the frame returns to an absolutely vertical position—i.e., it ceases to touch either of the screws 28, 29. If required, the action of the torsion wire 30 can be extended by weights being hung on the beam 34.

As the foregoing theoretical survey shows, when the vertical blade containing the axes of rotation of the dish 9 and ball 21 is perpendicular to the suspension axis Y of the frame 25, the torque measured on the frame 25 is the elastic reaction torque C′ which the liquid applies to the ball 21; when the vertical plane formed by the axes of rotation of the member 9 and ball 21 contains the axis Y, the torque measured by the frame 25 is the viscous reaction torque C″; and when the torque measured by the frame 25 is zero, the plane formed by the axes of rotation of the member 9 and ball 21 forms an angle δ with the axis Y defined by:

$$tg\delta = \frac{C''}{C'}$$

Measurement example

After the apparatus has been adjusted—i.e., after the plate 2 has been levelled and the two spheres have been adjusted for spacing and coaxiality—4.5 cc. of a liquid which it is required to study is introduced by means of a calibrated syringe. The adjusting screw 29 is lowered 2 mm., so that the drive shaft 11 for the dish 9 is inclined to the vertical by an angle α such that $tg\alpha = 1/33$.

The graduated ring 17 is then rotated to bring the plane containing the axes of rotation of the dish 9 and ball 21 perpendicular to the axis Y around which the resilient component of the torque applied by the liquid to the ball 21 will be measured. When the dish and ball rotate at 150 r.p.m., the frame 25 touches one of the screws 28, 29 and an opposing torque C′ of 57.5 g.f. cm. must be applied by turning the torsion wire through 11°, to restore equilibrium; the torsion constant of the torsion wire 30 is 5.21 g.f./°. The moving ring 17 is then turned so that the plane of the axes of rotation of the dish 9 and ball 21 contains the axis Y. In this position the viscous component of the reaction torque of the liquid on the ball 21 is measured. If the same values are used for α and for the speed of rotation (150 r.p.m.) of the spheres, it is found necessary to apply an opposing torque C″ of 445 g.f. cm. to return the frame 25 to the completely vertical position. From the formulae given in the foregoing, the values:

$\eta = 880$ poises and E=1.800 dynes/cm.$^2$ can be derived from the values found for C′ and C″, bearing in mind that in the apparatus used, the operative surface of the spheres represents only 0.643 of the total theoretical surface. If δ is measured directly at zero torque, it is found equal to 82°30′ and by calculation:

$$tg\delta = C''/C' = 445/57.5$$

which gives δ=82°40′.

These values for E and η correspond to the values found by other methods for this liquid, thus providing experimental confirmation of the soundness of the theoretical principle hereinbefore described and serving as a basis for construction of the rheometer balance according to the invention.

The process can also be used to measure the internal friction and elasticity of a solid body.

An apparatus for performing such a process mainly comprises: two shafts which are disposed in the same orientable plane and which are disposed at an adjustable inclination to one another; means for rotating the two shafts synchronously and to the same hand as one another; and means for measuring the torques on one of the shafts. The solid to be studied is placed so as to provide a connection between the two shafts, to the respective ends of which it is rigidly connected by any appropriate means such as keying, riveting, vicing or the like. The shape of the solid is such that a ready conversion into equations is possible of the relationships between the stresses applied to the solid and the reactions thereof arising from its viscoelastic properties. Measurement is performed just as hereinbefore described in the case of a liquid.

Figure 8:
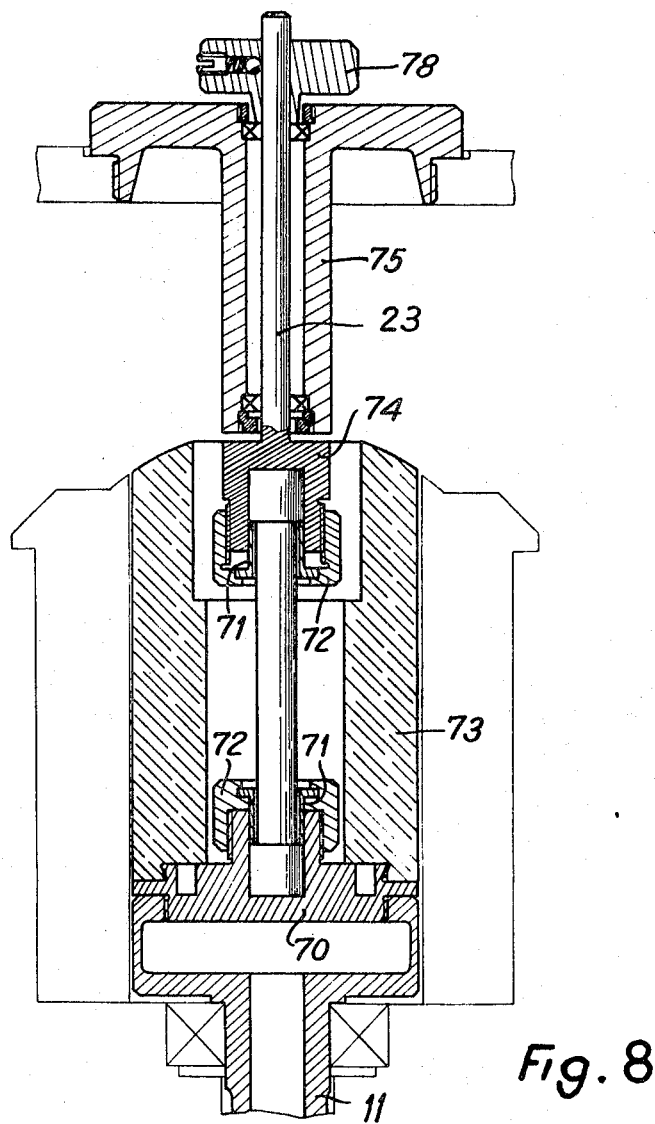
FIGURE 8 is a view of the device for positioning a solid specimen.
Figure 9:
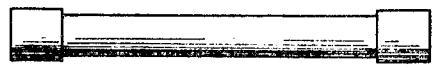
FIGURE 9 is a view of a solid specimen used.

The apparatus shown in FIGURE 8 is used to study a solid specimen. The two rotating "axes" 11, 23 are interconnected by a specimen of the solid to be studied; the two shafts must therefore both rotate at the same speed, and so the second synchronous motor 22 in FIGURE 4 can be omitted.

The specimen is as follows:

The two shoulders, which measure 10 mm. in diameter and 10 mm. in length and which are at the ends of the specimen, are to enable the same to be retained in appropriate jaws; the operative part of the specimen is 8 mm. in diameter and 60 mm. in length. The specimen is received in two recesses in members 70 (bottom jaw) and 74 (top jaw).

The specimen is secured in its retaining jaws as follows:

(1) Two screwthreaded cylindrical members placed back to back are threaded onto the specimen.

(2) The same is pushed right home into each of the recesses in the jaws 74 and 70.

(3) The shoulder of the specimen is secured in each jaw by two hemicylinodrical grippers 71, each gripper being half of what was originally a cylinder cut along a plane of symmetry.

(4) The half-grippers 71 are retained in position by one of the screwthreaded members 72 each being screwed on the top and bottom jaws 74, 70.

The system formed by the solid specimen and its two jaws 74, 70 secured as just stated are then introduced into the rheometer balance.

To use the device with solid specimens, the dish 9 is removed from the balance and replaced by the bottom jaw 70, the coaxial tube 24 and the motor 22 are removed and replaced by the coaxial tube 75, and the shaft 23 and ball 21 are replaced by the top jaw 74.

The specimen secured in its jaws is placed in the apparatus as follows:

The bottom jaw 70 is screwed into the shaft 11; the spindle of the top jaw 74 is engaged in the coaxial tube, the ball bearings which interconnect these two latter items being devised so that the jaw 74 slides with reduced friction, whereafter the coaxial tube 75 is screwed to the frame 25. A cupola 78 sliding on the spindle of the top jaw 74 and bearing on the inner ring of the top antifriction bearing is rigidly connected to the jaw 74 by a spring-biased ball, the purpose of this feature being to cancel the effect of the weight of the top jaw on the specimen. A heating cylinder 73 secured to the bottom jaw 70 can be used to supervise the temperature of the specimen.

Example of results obtained with a solid polythene specimen.

The material examined is a high-pressure polythene having a density of 0.924 at 20° C. and a grade of 0.35 (ASTM conditions).

The specimen under study has the following geometry:

| | Mm. |
|---|---|
| Cylinder length | 60 |
| Cylinder diameter | 8 |

The measurements are made at ambient temperature (20° C.).

Calculating the elastic reaction torque $C'$ by the circular plane flexion formulae (which is the deformation experienced in the apparatus) gives:

$$C' = \frac{\pi S' \alpha r^4}{4l}$$

We worked with $\alpha = \frac{1}{66}$—i.e. one turn of the screw 19. Therefore:

$$E' = \frac{4lc'}{\pi \alpha r^4} = \frac{4 \cdot 6 \cdot C'}{\pi \cdot \frac{1}{66} \cdot (0.4)^4} = 1.97 \cdot 10^4 C' \text{ (CGS system)}$$

in which:

$E'$ is the real part of Young's complex dynamic modulus $E''$ of the material, defined by $$E'' = E'(l + itg\delta) \text{ with } \sqrt{l-} = i$$

$l$ and $r$ are the length and radius respectively of the specimen, and $\alpha$ is the angle at which the two convergent axes of rotation are inclined to one another and is also the angle at the centre at which the deformed specimen is seen, its radius of curvature $P = l/\alpha$ being constant in the circular flexion deformation.

We compared the values for $E'$ and $tg\delta$ obtained on the rheometer balance with the values measured on a dynamic measuring rig operating by forced transverse vibrations of parallelepipedic rods. Comparison of the results is given in the following table:

| | $E'$ | $tg \delta$ |
|---|---|---|
| Rheometer balance | $3.7 \cdot 10^9$ dynes/cm.² | 0.14 |
| Other rig | $3.5 \cdot 10^9$ dynes/cm.² | 0.15 |

These measurements were made at 20° C. at a rotational speed of 20 r.p.m.—i.e., with $\omega = 126$ radians/second.

The measured torques were therefore:

| | G.f. cm. |
|---|---|
| $C''$ | 27 |
| $C'$ | 191 |

Of course, a measuring procedure of this kind, and the rheometer balance disclosed by this invention, can be modified in many ways without departure from the scope of the invention.

What I claim is:

1. A process for determining the viscosity and elasticity properties of a solid or liquid viscoelastic medium, comprising the steps of inserting the medium between opposed revolving members, rotating the revolving members at the same speed and in the same direction about unaligned but converging axes, and sensing the reaction torque applied by the medium to one of the revolving members.

2. A process according to claim 1, and including the steps of sensing said reaction torque applied by the medium to one of the revolving members about a further axis which passes through the point of convergence of the members axes, and is at right angle to the axis of the said revolving member, measuring the reaction torque when this further axis is in the plane of the two revolving members axes, rotating said further axis ninety degrees, and again measuring said reaction torque about said further axis.

3. A process according to claim 1, and including the steps of sensing said reaction torque applied by the medium to one of the revolving members about a further axis which passes through the point of convergence of the members axes, and is at right angle to the axis of the said revolving member, rotating said further axis until the reaction torque is null, measuring the angle with the plane of the two revolving members axes, rotating said further axis ninety degrees and again measuring said reaction about said further axis.

4. A process according to claim 1 wherein the viscoelastic medium is a liquid and wherein opposed surfaces of the said revolving members are maintained at all times spaced apart the same distance and at the same distance from the common center of the two surfaces.

5. A process according to claim 1 wherein the viscoelastic medium is a solid of cylindrical shape and wherein each end of the specimen is held in a fixed relation and is coaxial to the corresponding revolving member.

6. A rheometer balance for determining the viscosity and elasticity properties of a solid or liquid viscoelastic medium, comprising a rigid frame, opposed revolving members between which the medium is to be inserted, said revolving members being mounted for rotation about unaligned but converging axes, means for rotating the revolving members at the same speed, in the same direction, and means for sensing a reaction torque applied by the medium to one of the revolving members.

7. A rheometer balance according to claim 6 wherein the opposed surface of the said revolving members are defined by two concentric, part spherical surfaces, the separating gap between them serving to receive a liquid to be studied, said axes being adjustably inclined at small angle to one another and disposed in a common plane, means for selectively orienting said common plane around the axis of one of the part-spherical surfaces, said spherical surface being secured to a device for measuring the torque moments around a further axis at right angle to the said surface axis, and passing through the common center of the part-spherical surfaces.

8. A rheometer balance according to claim 7 and including means associated with one of the part-spherical surfaces for heating and controlling the temperature of the liquid to be studied.

9. A rheometer balance according to claim 7 wherein one of the part-spherical surfaces is provided by a member mounted in a cradle whose inclination is adjustable around a horizontal axis passing through the common center of the two part-spherical surfaces, the horizontal axis being orientable in all the directions of the horizontal plane, the other part-spherical surface being provided by a second member secured to a frame movable between two abutments around a horizontal axis passing through the common center of the two part-spherical surfaces, and wherein a torsion wire is mounted in extension of the latter axis to balance and measure the torques acting on the frame and a balanced beam is provided which is rigidly connected to the moving frame and which can receive extra weights for supplementing, if need be, the action of the torsion wire.

10. A rheometer balance according to claim 6 and including means for securing the ends of a solid specimen of cylindrical shape, each one coaxially to each of said revolving members, means secured to one of said members, for measuring the torque moment around an axis at right angle to the said secured member, and passing through the imaginary meeting point of the two members axes, and a synchronous motor for driving the other member at a controlled speed.

References Cited

UNITED STATES PATENTS 2,568,793   9/1951   De Beaumont _____ 73—60

FOREIGN PATENTS 711,899   7/1954   Great Britain.

LOUIS R. PRINCE, Primary Examiner

J. W. ROSKOS, Assistant Examiner